United States Patent
Liu et al.

(10) Patent No.: US 10,216,321 B2
(45) Date of Patent: Feb. 26, 2019

(54) TOUCH DISPLAY DEVICE AND ASSOCIATED CONTROL METHOD

(71) Applicant: ILI TECHNOLOGY CORP., Hsinchu County (TW)

(72) Inventors: Chi-Kang Liu, Zhubei (TW); Guo-Kiang Hung, Zhubei (TW); Song-Yi Lin, Zhubei (TW); Ping-Yu Chan, Zhubei (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 53 days.

(21) Appl. No.: 15/414,737

(22) Filed: Jan. 25, 2017

(65) Prior Publication Data

US 2017/0228087 A1 Aug. 10, 2017

(30) Foreign Application Priority Data

Feb. 4, 2016 (TW) .............................. 105103771 A

(51) Int. Cl.
  *G06F 3/041* (2006.01)
  *G06F 3/044* (2006.01)
  *G09G 3/36* (2006.01)

(52) U.S. Cl.
  CPC ............ *G06F 3/0416* (2013.01); *G06F 3/044* (2013.01); *G06F 3/0412* (2013.01); *G09G 3/3677* (2013.01); *G09G 3/3688* (2013.01); *G09G 2310/0286* (2013.01); *G09G 2354/00* (2013.01)

(58) Field of Classification Search
  CPC ...... G06F 3/0412; G06F 3/0416; G06F 3/044; G09G 3/3677; G09G 3/3688; G09G 2310/0286
  See application file for complete search history.

(56) References Cited

U.S. PATENT DOCUMENTS

2014/0292709 A1* 10/2014 Mizuhashi ............ G06F 3/0416
                                                                345/174
2017/0115808 A1*  4/2017 Cho ..................... G06F 3/0412

FOREIGN PATENT DOCUMENTS

CN       104485082 A      4/2015
CN       104679342 A      6/2015

OTHER PUBLICATIONS

TIPO Office Action, dated Feb. 10, 2017, 11 pages.

* cited by examiner

*Primary Examiner* — Towfiq Elahi
(74) *Attorney, Agent, or Firm* — JCIPRNET

(57) ABSTRACT

A control method for a touch display device including a display panel is provided. The display panel includes multiple first gate lines and multiple second gate lines respectively corresponding to a first field and a second field of a frame, and multiple sensing electrodes for touch sensing. Within one single frame period, the control method includes: scanning the first gate lines to update the first field; controlling the sensing electrodes to perform touch sensing and providing a first touch report; scanning the second gates lines to update the second field; and controlling the sensing electrodes to perform touch sensing and providing a second touch report. At least one of the first gates lines is located between two of the second gate lines, and at least one of the second gate lines is located between two of the first gate lines.

10 Claims, 4 Drawing Sheets

TOUCH DISPLAY DEVICE AND ASSOCIATED CONTROL METHOD

This application claims the benefit of Taiwan application Serial No. 105103771, filed Feb. 4, 2016, the subject matter of which is incorporated herein by reference.

BACKGROUND OF THE INVENTION

Field of the Invention

The invention relates in general to a touch display device, and more particularly to a touch display device capable of increasing a touch report rate and an associated control method.

Description of the Related Art

A touch display device is an image display device that includes an input device. The display device may be, for example, a liquid crystal display (LCD), a field emission display (FED), a plasma display panel (PDD) or an electroluminescent display (ELD). A touch display device allows a user to input an instruction or message by touching or pressing a touch sensor on a screen through a finger or a stylus, while viewing an image displayed on the screen of the display device.

A conventional touch display device is formed by additionally attaching a touch panel including touch sensors on a common display screen without a touch function. Such type of touch display device is generally referred to as an add-on type touch panel. Compared to a common display screen without a touch function, an add-on type touch panel usually suffers from issues of a larger thickness and poorer light transmittance.

To overcome the issues above and to at the same time eliminate the additional manufacturing process of attaching a touch panel, an in-cell touch technology has been developed for a touch display device. For example, an in-cell touch panel directly places touch sensors into a display screen. In other words, when the manufacture of the display screen is complete, the touch sensors are simultaneously formed without involving the additional process of attaching a touch panel.

For an in-cell touch screen, the time for updating data of all pixels thereon is referred to as one display frame period, and is usually defined by a cycle of a vertical synchronization signal. The reciprocal of the display frame period is generally referred to as a frame update rate, or simply frame rate.

In an in-cell touch screen, some electrodes are required to handle dual functions of image display and touch sensing. Therefore, a time-division method is frequently adopted for these electrodes to sometimes control the function of image display and sometimes handle the function of touch sensing. One simplest is approach is that, after the data of all of the pixels is updated once and before the next display frame period begins, touch sensing is performed and a touch report is transmitted. A frequency of generating touch point information is usually referred to as a touch report rate. In a common in-cell touch screen, the touch report rate is equal to the frame rate. For example, if the frame rate is 60 Hz, the touch report rate of the common in-cell touch screen is also 60 Hz.

FIG. 1 shows an LCD panel 10 and an associated control circuit, which together serve as an example of a touch display device. On the LCD panel 10, a gate driver circuit 12, gate lines $G_1, G_2, \ldots$ and $G_N$, and data lines $D_1, D_2, \ldots$ and $D_M$ are formed. The LCD panel 10 includes an active region 14, in which a gate line and a data line 14 intersect to control a pixel. A data driving circuit 16 controls the data lines $D_1, D_2, \ldots$ and $D_M$. A timing controller 18 provides a corresponding signal to the gate driver circuit 12 to cause the gate driver circuit 12 to sequentially scan the gate lines $G_1, G_2, \ldots$ and $G_N$. The timing controller 18 also writes a digital signal into a register of the data driving circuit 16 according to an audio/video signal, and converts the digital signal to an analog data signal to drive the data lines $D_1, D_2, \ldots$ and $D_M$.

FIG. 1 further depicts an equivalent circuit in a pixel $Cell_{nm}$ correspondingly controlled by the gate line $G_n$ and the data line $D_m$. The pixel $Cell_{nm}$ may be a pixel of any of the colors red, green and blue. The gate line $G_n$ may turn on or turn off a thin-film transistor (TFT) $TM_{nm}$. Through the turned on TFT $TM_{nm}$, the data driving circuit 16 may store a data voltage $V_{nm}$ in a capacitor $C_{nm}$ of the pixel. A difference between a common voltage $V_{COM}$ on a common electrode and a data voltage $V_{nm}$ on a data electrode determines a twist level of the liquid crystals between the two electrodes, and thus determines a level of transmittance of light emitted from a backlight source (not shown) through the pixel $Cell_{nm}$.

FIG. 2 shows an operating timing applied to the touch display device in FIG. 1. The LCD panel 10 operates in a progressive scan mode. The gate lines $G_1, G_2, \ldots$ and $G_N$ are scanned for display in a period 20. The gate driver circuit 12 sequentially scan the gate lines $G_1, G_2, \ldots$ and $G_N$. For example, the gate driving circuit 12 first pulls the gate line $G_1$ to a high voltage while keeping the other gate lines at a low voltage. As such, the TFT of all of the pixels connected to the gate line $G_1$ are all turned on. At this point, the data driving circuit 16 may write appropriate data voltages into all of the pixels connected to the gate line $G_1$ through the data lines $D_1, D_2, \ldots$ and $D_M$, respectively. The gate driver circuit 12 then pulls the gate line $G_1$ down to a low voltage, and pulls the gate line $G_2$ to a high voltage, and the data driving circuit 16 writes appropriate data voltages into all of the pixels connected to the gate line $G_2$ through the data lines $D_1, D_2, \ldots$ and $D_M$, respectively. Thus, in the period 20, the data voltages of all of the pixels in FIG. 1 are updated. An entire image formed by all of the pixels in FIG. 1 is commonly referred to as a frame. In other words, one frame is updated in the period 20.

In a period 22, touch detection and report are performed. After one frame is updated in the period 20, touch detection and report may be performed using the data lines $D_1, D_2, \ldots$ and $D_M$ or the common electrode in FIG. 1 in the period 22 to provide one touch report.

In periods 24 and 26, the periods 20 and 22 are repeated. It should be noted that, as shown in FIG. 2, the periods 20 and 22 are completed in one frame period $T_{FRAME}$, and the periods 24 and 26 are completed in a next frame period $T_{FRAME}$. If the frame rate in FIG. 2 is 60 Hz, the frame period $T_{FRAME}$ in FIG. 2 is 1/60 second, and the touch report rate, the same as the frame rate, is also 60 Hz.

However, to provide a more sensitive and fast touch response, some software system manufacturers demand a touch report rate to be as high as 100 Hz. Therefore, there is a need for a solution for increasing the touch report rate.

SUMMARY OF THE INVENTION

According to an embodiment of the present invention, a touch display device includes a display panel, a gate driver, a touch detection circuit and a timing controller. The display panel includes a plurality of first gate lines and a plurality of second gate lines. One least one of the first gates lines is located between two adjacent second gate lines, and at least one of the second gate lines is located between two adjacent first gate lines. The display panel includes a plurality of sensing electrodes for touch detection. The gate driver drives the first and second gate lines. The touch detection circuit is connected to the sensing electrodes, and provides a first touch report and a second touch report within in one single frame period. The timing controller controls the gate driver to scan the first gate lines and the second gate lines in a first period and a second period, respectively, within the one single frame period. The first touch report is between the first and second periods, and is provided by the touch detection circuit.

According to another embodiment of the present invention, a control method for a touch display device is provided. The touch display device includes a display panel. The display panel includes a plurality of gate lines and a plurality of second gate lines corresponding to a first field and a second field of a frame, respectively, and a plurality of sensing electrodes for touch detection. Within one single frame period, the control method includes: scanning the first gate lines to update the first field at the display panel; controlling the sensing electrodes to perform touch detection and providing a first touch report; scanning the second gate lines to update the second field at the display panel; and controlling the sensing electrodes to perform touch sensing and providing a second touch report. At least one of the first gate lines is located between two of the second gate lines, and at least one of the second gate lines is located between two of the first gate lines.

The above and other aspects of the invention will become better understood with regard to the following detailed description of the preferred but non-limiting embodiments. The following description is made with reference to the accompanying drawings.

DETAILED DESCRIPTION OF THE INVENTION

Throughout the disclosure, as anticipatable by one person skilled in the art based on the teaching of the disclosure, same denotations represent elements having identical or similar structures, functions and principles. To keep the disclosure concise and simple, details of elements with the same denotations are not repeatedly described.

Figure 3:
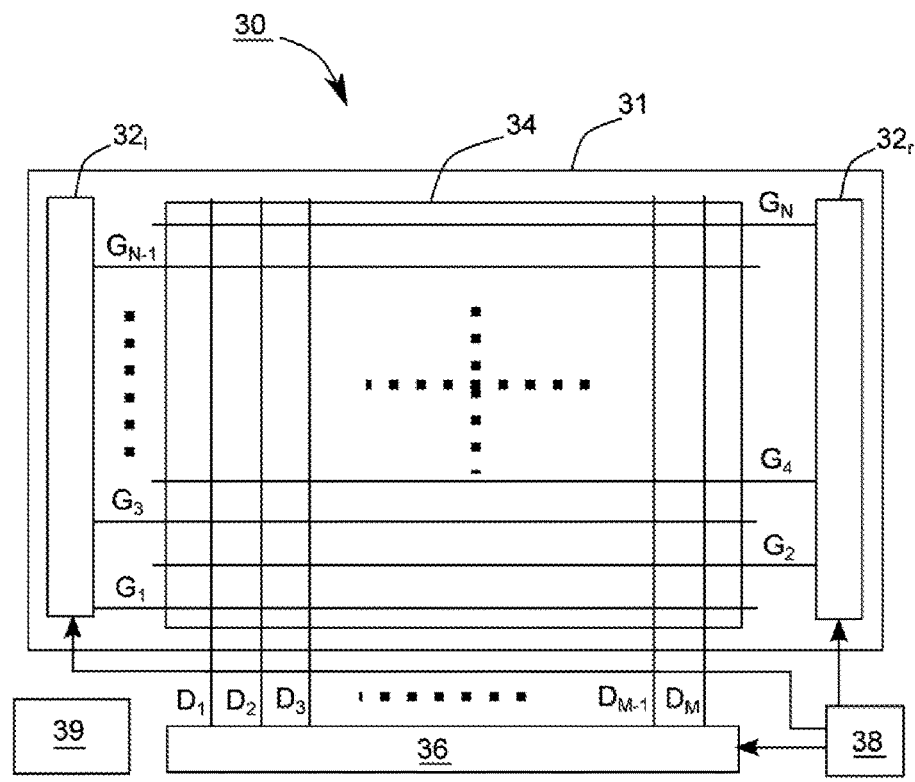
FIG. 3 is a touch display device according to an embodiment of the present invention.

FIG. 3 shows a touch display device 30 according to an embodiment of the present invention. The touch display device 30 includes an LCD panel 31, a data driving circuit 36, a timing controller 38 and a touch integrated circuit 39.

Figure 1:
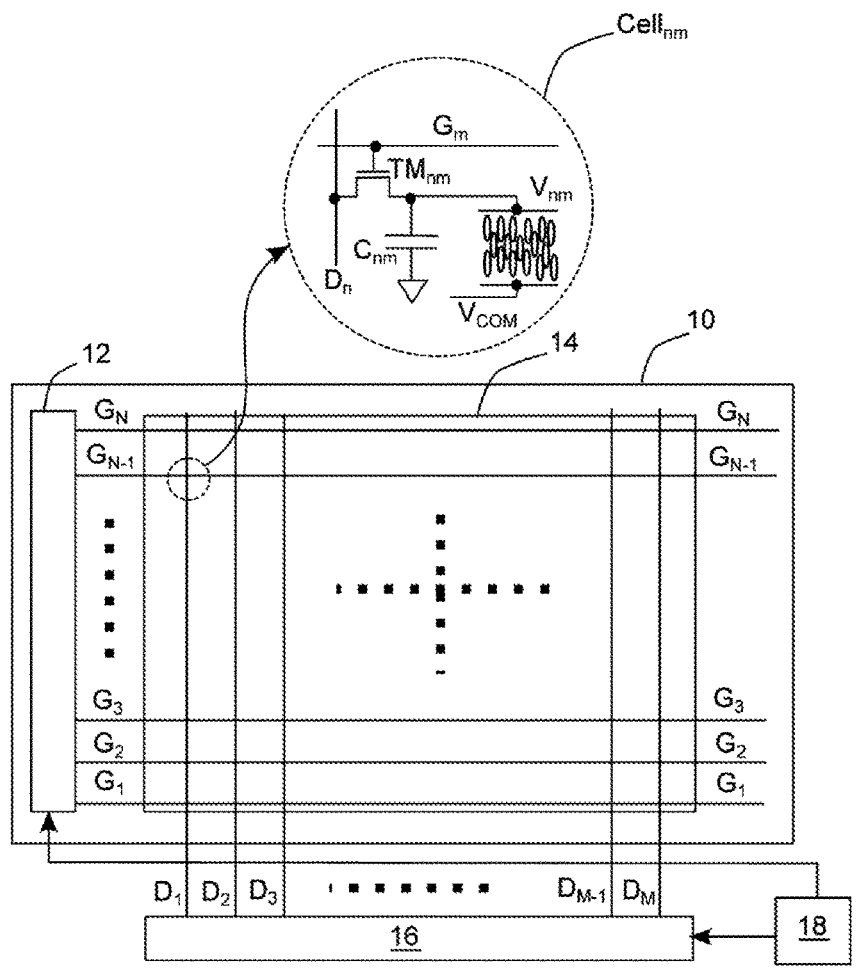
FIG. 1 (prior art) is an LCD panel and an associated control circuit jointly serving as an example of a touch display device.
Figure 2:
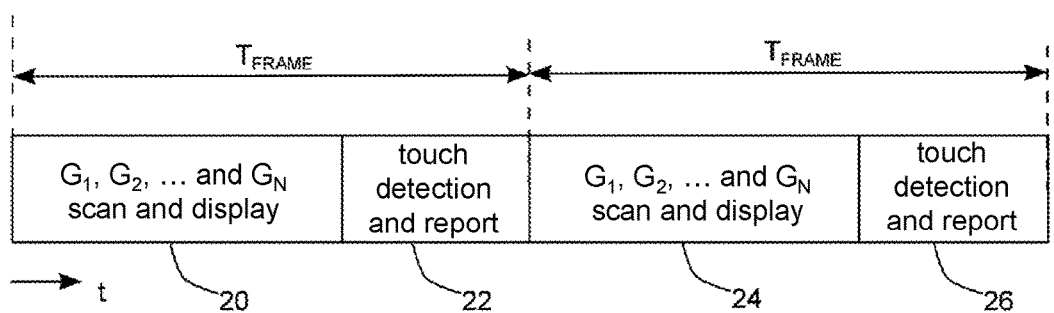
FIG. 2 (prior art) is an operating timing applied to the touch display device in FIG. 1.

Two gate driving circuits $32_l$ and $32_r$, gate lines $G_1$, $G_2$, ... and $G_N$, and data lines $D_1$, $D_2$, ... and $D_M$ are formed on the LCD panel 31. The LCD panel 31 includes an active region 34, in which one gate line intersects one data line to substantially control one pixel, as an example shown in FIG. 1. Parts in FIG. 3 that are identical or similar to those in FIG. 1 are omitted for brevity. In FIG. 3, the gate lines $G_1$, $G_2$, ... and $G_N$ are divided into two groups—a first group including odd-number gate lines $G_1$, $G_3$, ... and $G_{N-1}$, and the other group including even-number gate lines $G_2$, $G_4$, ... and $G_N$. The gate line $G_2$ is between the gate lines $G_1$ and $G_3$, and the gate line $G_3$ is between the gate lines $G_2$ and $G_4$. In the embodiment in FIG. 3, assume that N is an even number. The gate driving circuits $32_l$ and $32_r$ collectively form a gate driver that controls all of the gate lines $G_1$, $G_2$, ... and $G_N$. The gate driving circuits $32_l$ and $32_r$ are located outside the active region 34, and are near left and right sides of the active region 34, respectively. The gate driving circuit $32_l$ may drive the odd-number gate lines but not the even-number gate lines, and the gate driving circuit $32_r$ may drive the even-number gate lines but not the odd-number gate lines.

The data driving circuit 36 controls the data lines $D_1$, $D_2$, ... and $D_M$. The timing controller 38 provides corresponding signals to the gate driving circuits $32_l$ and $32_r$ and controls the data driving circuit 3. Associate details of the operating timing are to be described shortly.

Figure 4:
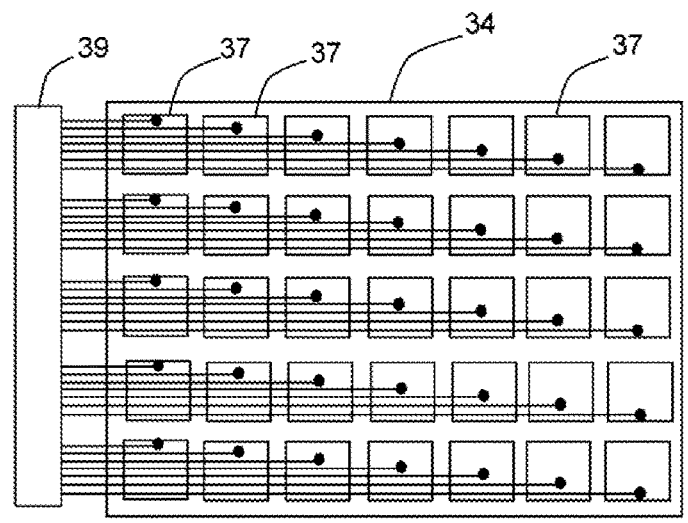
FIG. 4 shows a touch integrated circuit and a common electrode plate located in an active region.

FIG. 4 shows an example of the touch integrated circuit 39 and common electrode plates 37 located in the active region 34 for explaining the touch detection performed by the touch display device 30. Each of the common electrode plates 37 corresponds to one or multiple pixels to serve as a sensing electrode. The touch integrated circuit 39 serves as a touch detection circuit, and may sequentially measure self capacitance changes of every common electrode plate 37 to determine whether a touch point occurs and a position of the touch point to perform touch report. The LCD panel 31 is a capacitive touch panel. In one embodiment, the touch integrated circuit 39 may sequentially measure individual self capacitance changes of the common electrode plates 37 on one entire row one row after another to perform touch detection and report. When the pixels on the LCD panel 31 are being updated, the touch integrated circuit 39 provides the common voltage VCOM in a constant value to all of the common electrode plates 37, and so the touch display device 30 cannot simultaneously perform touch detection and report. The present invention is not limited to the structure shown in FIG. 4. It should be noted that, the structure in FIG. 4 is an example for explaining one type of structure used for touch detection, and how touch detection and report cannot be simultaneously performed with updating the pixels.

Figure 5:
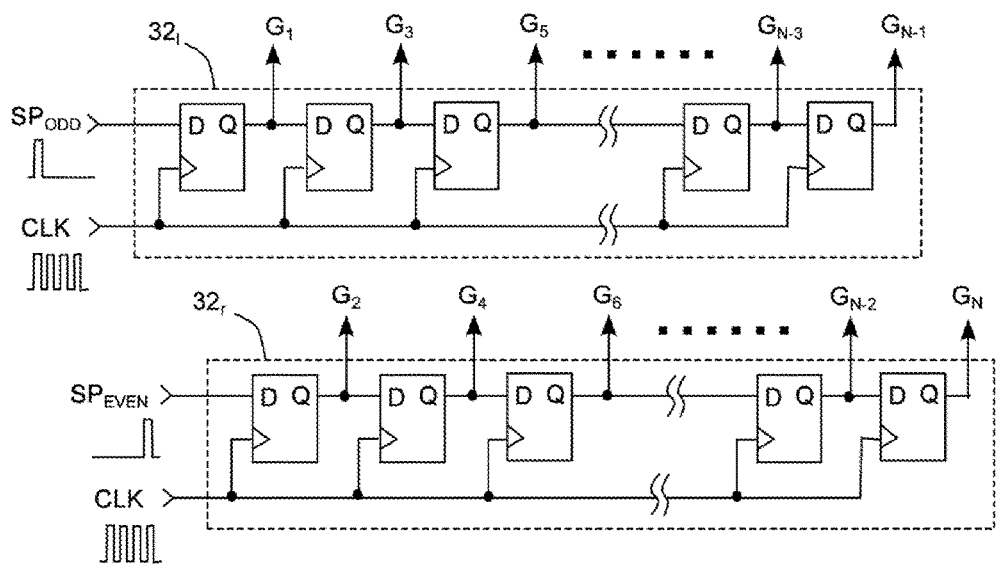
FIG. 5 is an example of two gate driver circuits.

FIG. 5 shows an example of the gate driving circuits $32_l$ and $32_r$, each being a shift register. The timing controller 38 provides a clock signal CLK and a starting pulse $SP_{ODD}$ to the gate driving circuit $32_l$, but provides the clock signal CLK and a starting pulse $SP_{EVEN}$ to the gate driving circuit $32_r$. Time points at which the starting pulse $SP_{ODD}$ and the starting pulse $SP_{EVEN}$ occur are determined by the timing controller 38. The starting pulse $SP_{ODD}$ first shifts to the gate line $G_1$, the gate line $G_3$, the gate line $G_5$, and so on, and eventually leaves the gate line $G_{N-1}$ as the clock signal CLK switches. Similarly, starting from the gate line $G_2$, the starting pulse $SP_{EVEN}$ gradually shifts to the gate line $G_N$ and eventually leaves the gate line $G_N$ as the clock signal CLK switches. The gate driving circuits $32_l$ and $32_r$ may be integrated in the LCD panel 31. For example, the switches in the gate driving circuits $32_l$ and $32_r$ may be formed by TFTs identical or similar to the TFT $TM_{nm}$ in the pixels.

Figure 6:
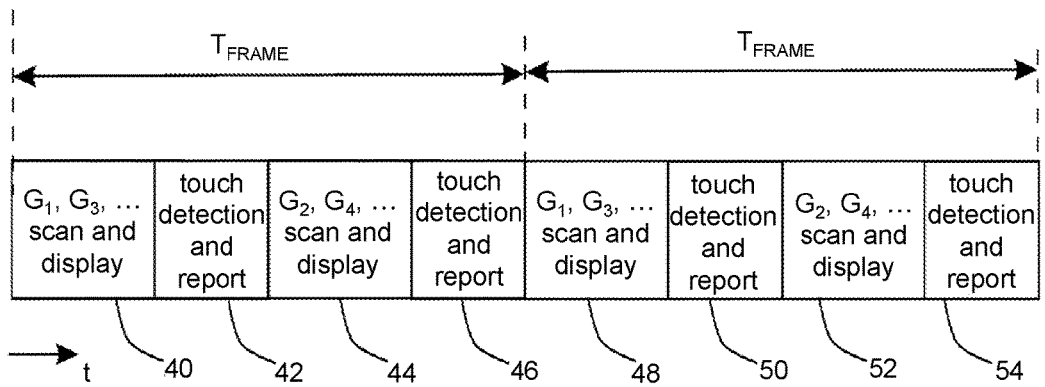
FIG. 6 is a diagram of an operating timing applied to the touch display device in FIG. 3.
Figure 7:
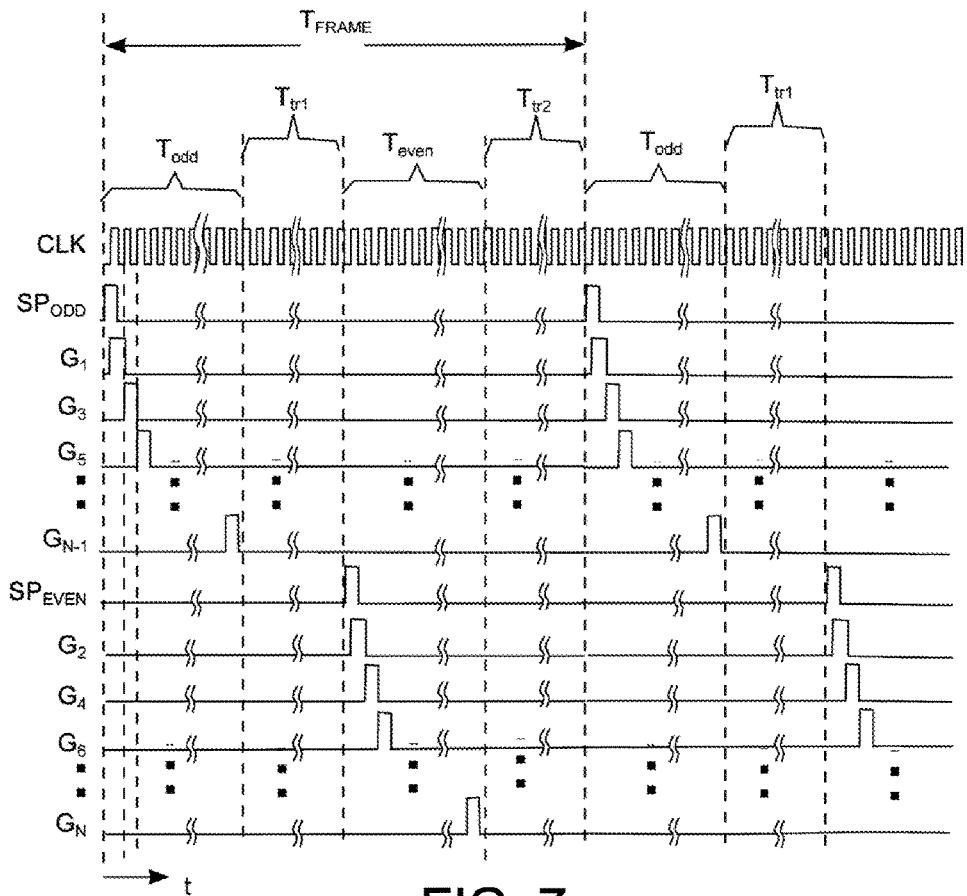
FIG. 7 shows signal timings of FIG. 3.

FIG. 6 shows an operating timing applied to the touch display device 30 in FIG. 3, and FIG. 7 shows signal timings of FIG. 3. In this embodiment, the touch display device 30 operates in an interlaced scan mode.

The gate lines $G_1, G_3, \ldots$ and $G_{N-1}$ are scanned for display in a period 40, which is completed in a period $T_{odd}$ in FIG. 7. As shown in FIG. 3, the timing controller 38 initially provides the starting pulse $SP_{ODD}$. As the clock signal CLK switches, the gate driving circuit $32_l$ sequentially scan the gate lines $G_1, G_3, \ldots$ and $G_{N-1}$. Meanwhile, the gate driving circuit $32r$ keeps the voltages on all of the even-number gate lines (the gate lines $G_2, G_4, \ldots$ and $G_N$) unchanged. The data driving circuit 36 may write appropriate data voltages into all of the pixels of the odd-number gate lines through the data lines $D_1, D_2, \ldots$ and $D_M$. Each of the common electrode plates 37 is provided with the fixed common voltage $V_{COM}$ by the touch integrated circuit 39 at this point. Throughout the specification, an image formed by all of the pixels of the odd-number gate lines is referred to as an odd field; an image formed by of the pixels of the even-number gate lines is referred to as an even field. One odd field and one even field form one frame. In brief, the odd field is updated in the period 40.

Touch detection and report are performed in a period 42, which is completed in a period $T_{tr1}$ in FIG. 7. After the odd field is updated in the period 40, touch detection and report may be performed using the common electrode plates 37 in FIG. 4 in the period 42. For example, the voltages on the common electrode plates 37 are sequentially changed to measure the individual self capacitance changes of every common electrode plate 37, so as to determine whether a touch point occurs and a position of the touch point. A first touch report is provided in the period 42.

The gate lines $G_2, G_4, \ldots$ and $G_N$ a in a period 44, which is completed in a period $T_{even}$ in FIG. 7. As shown in FIG. 7, the timing controller 38 initially provides the starting pulse $SP_{EVEN}$. As the clock signal CLK switches, the gate driving circuit $32_r$ sequentially scans the gate lines $G_2, G_4, \ldots$ and $G_N$. Meanwhile, the gate driving circuit $32_l$ keeps the voltages on all of the odd-number gate lines ($G_1, G_3, \ldots$ and $G_{N-1}$) unchanged. The data driving circuit 36 may write appropriate data voltages into all of the pixels of the even-number gate lines through the data lines $D_1, D_2, \ldots$ and $D_M$. Similarly, each of the common electrode plates 37 is provided with the constant common voltage $V_{COM}$ by the touch integrated circuit 39. In brief, the even field is updated in the period 44.

Touch detection and report are performed in a period 46, which is completed in a period $T_{tr2}$ in FIG. 7. A second touch report is provided in the period 46, and associated details may be identical or similar to those in the period 42.

As shown in FIG. 6, the odd field is updated in the period 40, and the even field is updated in the period 44. Thus, in one frame period $T_{FRAME}$, one entire frame is updated.

The periods 40, 42, 44 and 46 are repeated in the periods 48, 50, 52 and 54, respectively. As shown in FIG. 6, the periods 40, 42, 44 and 46 are completed in one frame period $T_{FRAME}$, and the periods 48, 50, 52 and 54 are completed in the next frame period $T_{FRAME}$. In FIG. 6, there are two touch reports in one frame period $T_{FRAME}$. If the frame rate in FIG. 6 is 60 Hz, the touch report rate in FIG. 6 is 120 Hz, which is twice the frame rate.

Figure 8:
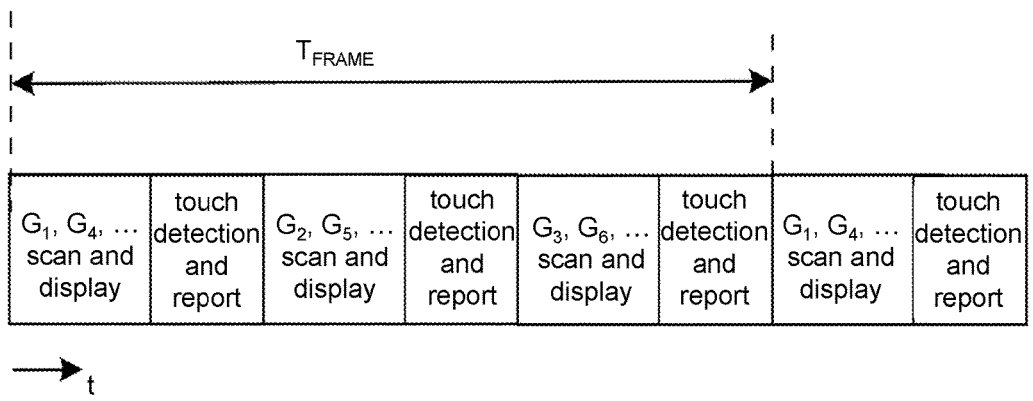
FIG. 8 is an operating timing according to an embodiment of the present invention.

The present invention does not limit the touch report rate to be twice the frame rate, and the touch report rate may also be three or more times the frame rate. For example, the gate lines $G_1, G_2, G_3 \ldots$ are divided into three groups—a first group including the gate lines $G_1, G_4 \ldots$, a second group including the gate lines $G_2, G_5 \ldots$, and a third group including the gate lines $G_3, G_6 \ldots$. A first field is an image displayed by the pixels in the first group, a second field is an image displayed by the pixels in the second group, and a third field is an image displayed by the pixels in the third group. The first, second and third fields together from one frame. FIG. 8 shows an operating timing implemented according to the present invention. In one frame period $T_{FRAME}$, the first, second and third fields are sequentially updated. The touch detection and report are performed once each time a field is updated. Thus, if the frame rate in FIG. 8 is 60 Hz, the touch report rate in FIG. 6 is 180 Hz, which is three times the frame rate.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display device, comprising:
   a display panel, comprising a plurality of first gate lines and a plurality of second gate lines, at least one of the first gate lines located between two adjacent second gate lines, at least one of the second gate lines located between two adjacent first gate lines, the display panel comprising a plurality of sensing electrodes for touch sensing;
   a gate driver, driving the first gate lines and the second gate lines;
   a touch detection circuit, connected to the sensing electrodes, providing a first touch report and a second touch report within one single frame period; and
   a timing controller, controlling the gate driver to scan the first gate lines and the second gate lines in a first period and a second period, respectively, within the one single frame period;
   wherein, the first touch report is between the first and second periods, and is provided by the touch detection circuit.

2. The touch display device according to claim 1, wherein the gate driver comprises a first gate driver and a second gate driver, the display panel comprises an active region having a first side and a second side that are opposite, and the first and second gate driving circuits are both formed on the display panel, outside the active region and near the first side and the second side, respectively.

3. The touch display device according to claim 2, wherein each of the first and second gate drivers is a shift register, and the timing controller provides a first starting pulse and a second starting pulse to the first gate driving circuit and the second gate driving circuit, respectively.

4. The touch display device according to claim 1, wherein when the gate driver scans the first and second gate lines, the touch detection circuit provides a constant common voltage to the sensing electrodes.

5. The touch display device according to claim 1, wherein the display panel is a capacitive touch panel.

6. The touch display device according to claim 1, wherein the display panel comprises a plurality of third gate lines, at least one of the third gate lines is between two adjacent second gate lines and also between two adjacent first gate lines; within the one single frame period, the gate driving circuit scans the third gate lines in a third period, and the touch detection circuit provides the second touch report between the second and third periods.

7. A control method for a touch display device, the touch display device comprising a display panel, the display panel comprising a plurality of first gate lines and a plurality of second gate lines respectively corresponding to a first field and a second field of a frame, the display panel further comprising a plurality of sensing electrodes for touch detection; within one single frame period, the control method comprises:
   scanning the first gate lines to update the first field in the display panel
   controlling the sensing electrodes to perform touch detection, and providing a first touch report;
   scanning the second gate lines to update the second field in the display panel; and
   controlling the sensing electrodes to perform touch detection, and providing a second touch report;
   wherein, at least one of the first gate lines is located between two of the second gate lines, and at least one of the second gate lines is located between two of the first gate lines.

8. The control method of claim 7, wherein the first field and the second field form a frame.

9. The control method of claim 7, wherein the display panel comprises a plurality of third gate lines, and in one single frame period, the control method further comprising:
   scanning the third gate lines to update a third field at the display panel; and
   controlling the sensing electrodes to perform touch sensing, and providing a third touch report;
   wherein, at least one of the third gate lines is located between two adjacent second lines and also between two adjacent first gate lines.

10. The control method of claim 9, wherein the first field, the second field and the third field form a frame.

* * * * *